United States Patent
Doy et al.

(10) Patent No.: US 10,844,557 B2
(45) Date of Patent: Nov. 24, 2020

(54) TOOL DEPTH SETTING

(71) Applicant: Caterpillar Paving Products Inc., Brooklyn Park, MN (US)

(72) Inventors: Nathaniel S. Doy, Maple Grove, MN (US); Lee M. Hogan, Champlin, MN (US); Jason W. Muir, Andover, MN (US); Hyppolite Kuissi, Peoria, IL (US); Matthew-David S. Frantz, Eden Prairie, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 16/365,983

(22) Filed: Mar. 27, 2019

(65) Prior Publication Data

US 2020/0308781 A1 Oct. 1, 2020

(51) Int. Cl.
*E01C 23/00* (2006.01)
*E01C 23/06* (2006.01)
*E01C 23/088* (2006.01)

(52) U.S. Cl.
CPC .......... *E01C 23/065* (2013.01); *E01C 23/088* (2013.01)

(58) Field of Classification Search
CPC .............................. E01C 23/065; E01C 23/088
USPC ............... 404/72, 75, 84.05–84.8, 90, 92–94
See application file for complete search history.

(56) References Cited

U.S. PATENT DOCUMENTS

| | | |
|---|---|---|
| 6,293,562 B1 | 9/2001 | Kutscher |
| 6,498,967 B1 | 12/2002 | Hopkins et al. |
| 6,769,836 B2 | 8/2004 | Lloyd |
| 8,424,972 B2 * | 4/2013 | Berning ................. E01C 23/088 299/1.5 |
| 8,764,118 B1 | 7/2014 | Krishnamoorthy et al. |
| 9,038,289 B2 | 5/2015 | Kelly |
| 9,057,161 B2 | 6/2015 | Berning et al. |
| 9,309,632 B2 * | 4/2016 | Fritz ....................... E01C 19/48 |
| 9,605,393 B2 | 3/2017 | Schlenker et al. |
| 9,879,391 B2 | 1/2018 | Berning et al. |
| 9,970,164 B2 | 5/2018 | Fritz et al. |
| 2002/0047301 A1 | 4/2002 | Davis |
| 2008/0153402 A1 | 6/2008 | Arcona et al. |

(Continued)

FOREIGN PATENT DOCUMENTS

| | | |
|---|---|---|
| CN | 102644232 | 8/2012 |
| CN | 205368983 | 7/2016 |

(Continued)

*Primary Examiner* — Raymond W Addie
(74) *Attorney, Agent, or Firm* — Schwegman, Lundberg & Woessner; Jeff A. Greene

(57) ABSTRACT

An implement with a ground-engaging tool may include a frame, a ground-engaging portion for supporting the frame on a surface of ground, and a suspension system coupling the ground-engaging portion to the frame and for adjusting the frame relative to the ground-engaging portion. The implement may also include a tool supported by and adjustable relative to the frame and configured for working the ground. The implement may also include a control and monitor system configured for establishing a nominal position of the tool relative to the surface and for establishing an actual position of the tool relative to the surface based on an offset adjustment. A method of determining a rotor tool depth of a milling machine and a method of operating a milling machine may also be provided.

20 Claims, 9 Drawing Sheets

(56) References Cited

U.S. PATENT DOCUMENTS

| | | | |
|---|---|---|---|
| 2009/0311045 A1* | 12/2009 | Jurasz | E01C 23/127 404/75 |
| 2012/0301220 A1* | 11/2012 | Snoeck | E01C 23/088 404/75 |
| 2015/0117951 A1* | 4/2015 | Schlenker | E01C 23/065 404/84.05 |
| 2016/0326701 A1 | 11/2016 | Schlenker et al. | |
| 2017/0254032 A1* | 9/2017 | Husar | E01C 23/088 |
| 2017/0362784 A1 | 12/2017 | Hoffmann et al. | |
| 2018/0023260 A1* | 1/2018 | Muir | E01C 23/065 404/84.05 |
| 2018/0058020 A1 | 3/2018 | Berning et al. | |
| 2018/0340302 A1 | 11/2018 | Menzenbach et al. | |
| 2019/0186261 A1* | 6/2019 | Berning | E21C 35/24 |
| 2020/0048843 A1* | 2/2020 | Kelly | E01C 19/008 |
| 2020/0063386 A1* | 2/2020 | Woell | E01C 23/088 |

FOREIGN PATENT DOCUMENTS

| | | |
|---|---|---|
| CN | 107881883 | 4/2018 |
| CN | 108004894 | 5/2018 |
| CN | 207392004 | 5/2018 |
| EP | 0547378 | 6/1993 |

\* cited by examiner

TOOL DEPTH SETTING

TECHNICAL FIELD

The present disclosure relates to establishing a reference point for a ground engaging tool of a machine or implement. More particularly, the present disclosure relates to establishing a ground-engaging reference point for the ground-engaging tool. Still more particularly, the present disclosure relates to establishing a ground-engaging reference point for a rotor of a rotary mixer.

BACKGROUND

Various machines or implements may include ground engaging tools for interacting, treating, or modifying the ground as the machine or implement travels. Such machines or implements may include plows, planters, or fertilizing equipment in the agricultural industry. In the construction industry, such machines or equipment may include earth movers or cold planers, rotary mixers, or other milling machines, for example. Still other examples may include grooming equipment for various situations.

The position of the ground-engaging tool relative to the ground can be important for an operator to know and monitor for several reasons. For purposes of completing the job at hand, the depth of the tool in the ground may be an important factor. That is, when planting, for example, a planter may want to control the furrow depth. When redressing a roadway bed, the operator may want to ensure that a particular amount of existing pavement, existing ground, and/or underlayment is being processed.

In many of the above listed examples, the various spatial relationships between the ground engaging tool, a portion of the machine that supports the tool, and the ground may be difficult to assess. Due to this problem, some of the above machines may simply allow the tool to rest on the ground and "float" relative to the machine using particular offset features to create the relationship desired between the ground and the tool. However, where larger amounts of power are desired and, where for example, the weight of the machine is desired to be used to more powerfully engage the ground, the tool may be adjustably fixed to the machine for engaging the ground rather than "floating."

In these circumstances, the relationship of the machine with the ground and the relationship between the machine and the tool may be helpful in determining the tool/ground relationship. However, due to several factors, these relationships are not always readily ascertainable. For example, inconsistent, uneven, soft, loose, or hard ground surfaces may cause the machine or implement to ride differently depending on the nature of the surface it is being used on. Machine tolerances may differ from one machine to another and may change over time as parts and components wear. Tire pressures on larger machines may affect the height that the machine rides relative to the ground. Suspension or other wheel connection features may create disparities from machine to machine or from one portion of the machine to another. Side-to-side unevenness on the ground can also create difficulty when establishing a relationship between a tool and the ground. Still further, adjustable components of the machine may add to the complicated nature of establishing the tool's position relative to the ground.

Other related technologies may include some of the following. For example, Chinese patent 102,644,232 relates to a milling machine and a control method and control device of a milling machine. U.S. Patent Application 2018/0058020 relates to a method for working ground pavements, as well as a self-propelled construction machine. U.S. Patent Application 2018/0340302 relates to a machine train composed of a road milling machine and a road finisher, and a method for operating a road milling machine and road finisher. However, a distinction between a reclaimer (i.e., rotary mixer) and a cold planer is that the rotor of a reclaimer is adjustable in height relative to the frame of the machine, whereas a rotor on a cold planer is typically fixed relative to the machine. Different issues arise when dealing with a rotary mixer or other implement where the ground-engaging tool is adjustable relative to the frame of the machine.

SUMMARY

In one or more embodiments, an implement with a ground-engaging tool may include a frame, a ground-engaging portion for supporting the frame on a surface of ground, and a suspension system coupling the ground-engaging portion to the frame and for adjusting the frame relative to the ground-engaging portion. The implement may also include a tool supported by and adjustable relative to the frame and configured for working the ground. The implement may also include a control and monitor system configured for establishing a nominal position of the tool relative to the surface and for establishing an actual position of the tool relative to the surface based on an offset adjustment.

In one or more embodiments, a method of determining a rotor tool depth of a milling machine may include calculating a frame height associated with a plurality of ground-engaging portions of the milling machine. The method may also include calculating a frame height of the frame at a support location of a rotor control lever of a rotor tool of the milling machine. The method may also include calculating a cut depth based on a position and geometry of a rotor control lever and geometry of the rotor tool.

In one or more embodiments, a method of operating a milling machine may include adjusting a rotor tool of the milling machine to a nominal scratch position and visually inspecting the rotor tool to determine an actual position of the rotor tool. The method may also include adjusting one of a position of the rotor tool and a leg of the milling machine to cause the rotor tool to move to an actual scratch position. The method may also include capturing an offset adjustment between the nominal scratch position and the actual scratch position by selecting an offset adjustment input.

DETAILED DESCRIPTION

Figure 1:
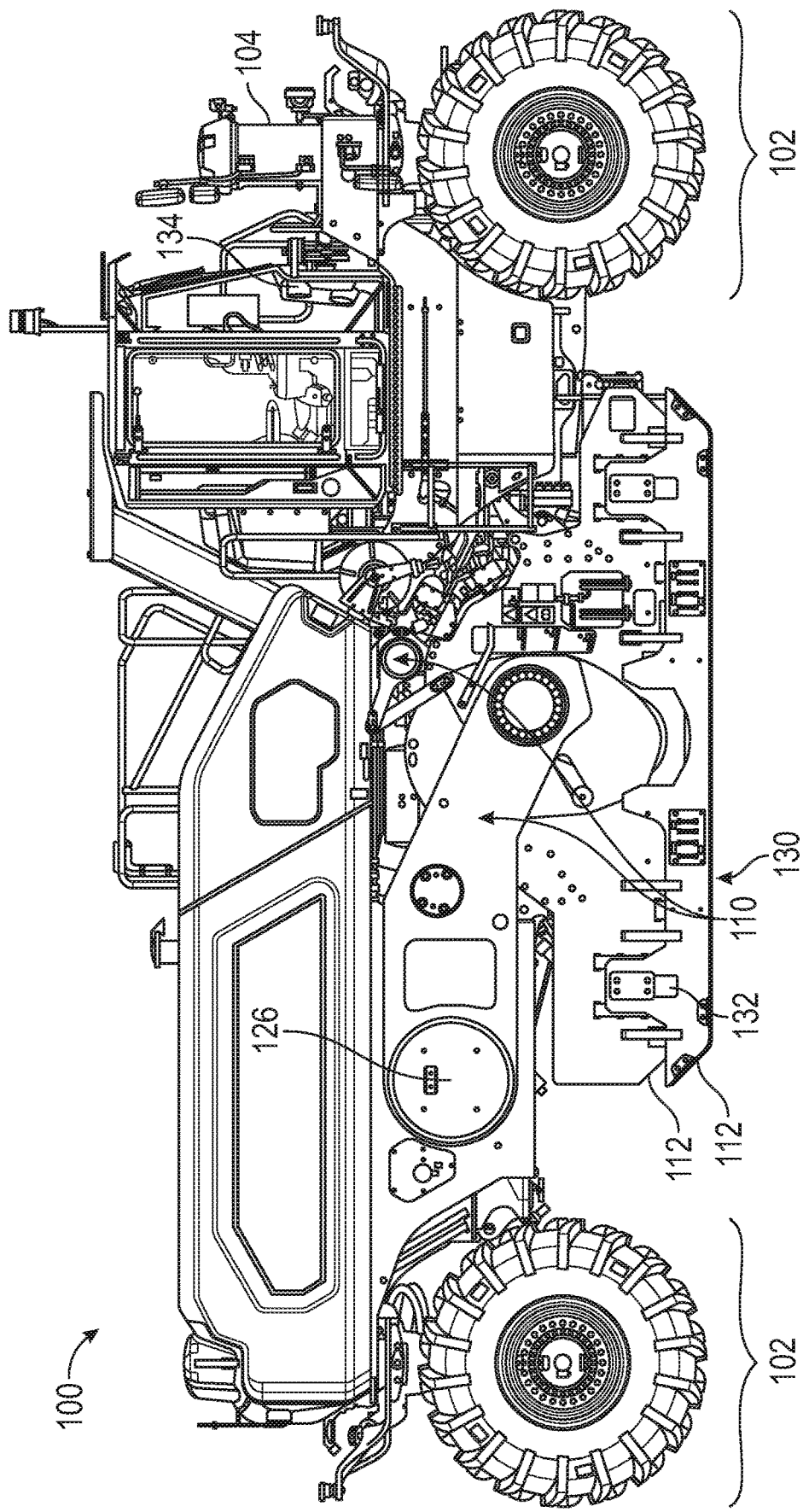
FIG. 1 is a side view of a rotary mixer, according to one or more embodiments.
Figure 2:
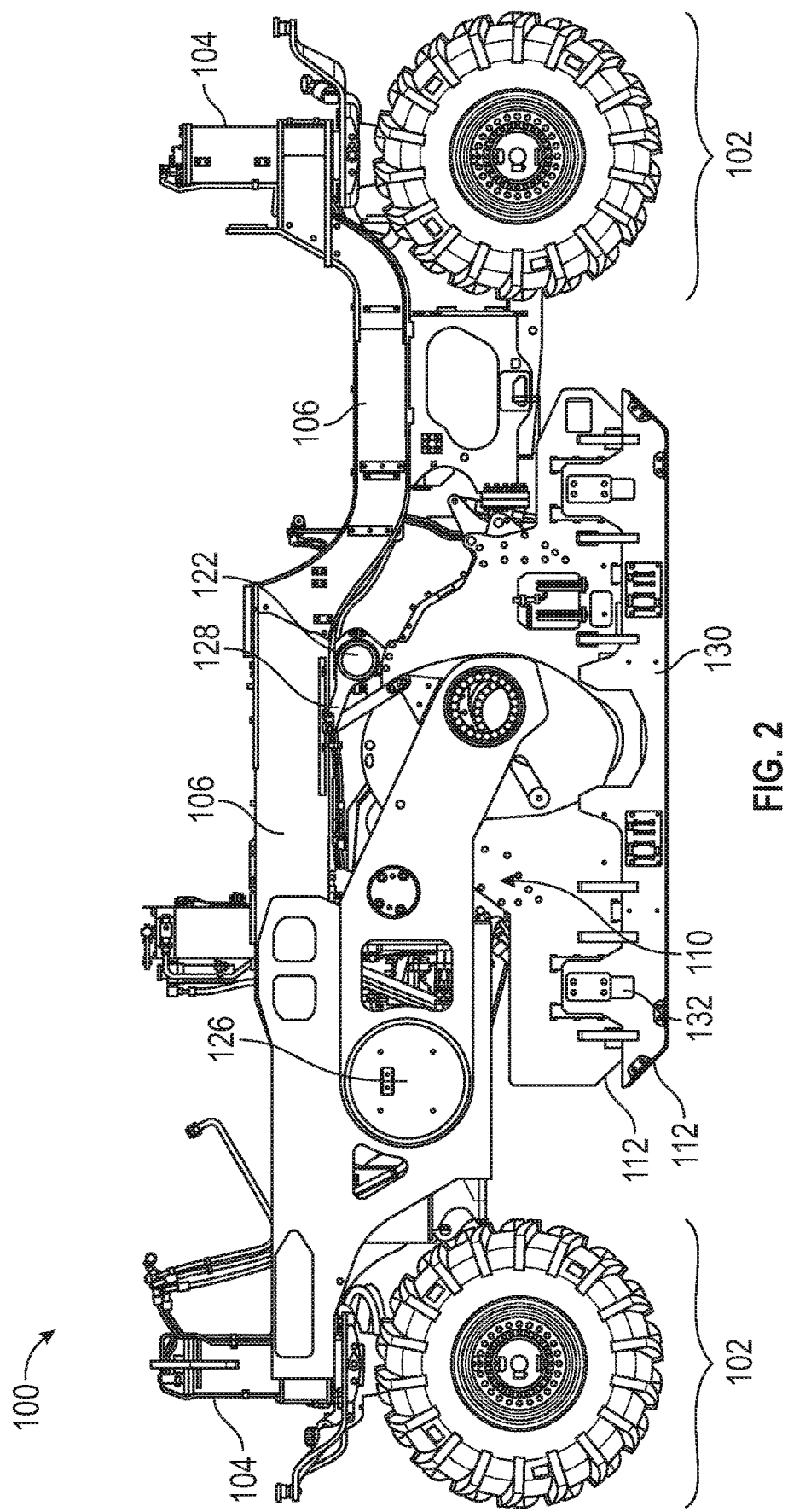
FIG. 2 is aside view of a frame and rotor portion of a rotary mixer, according to one or more embodiments.
Figure 3:
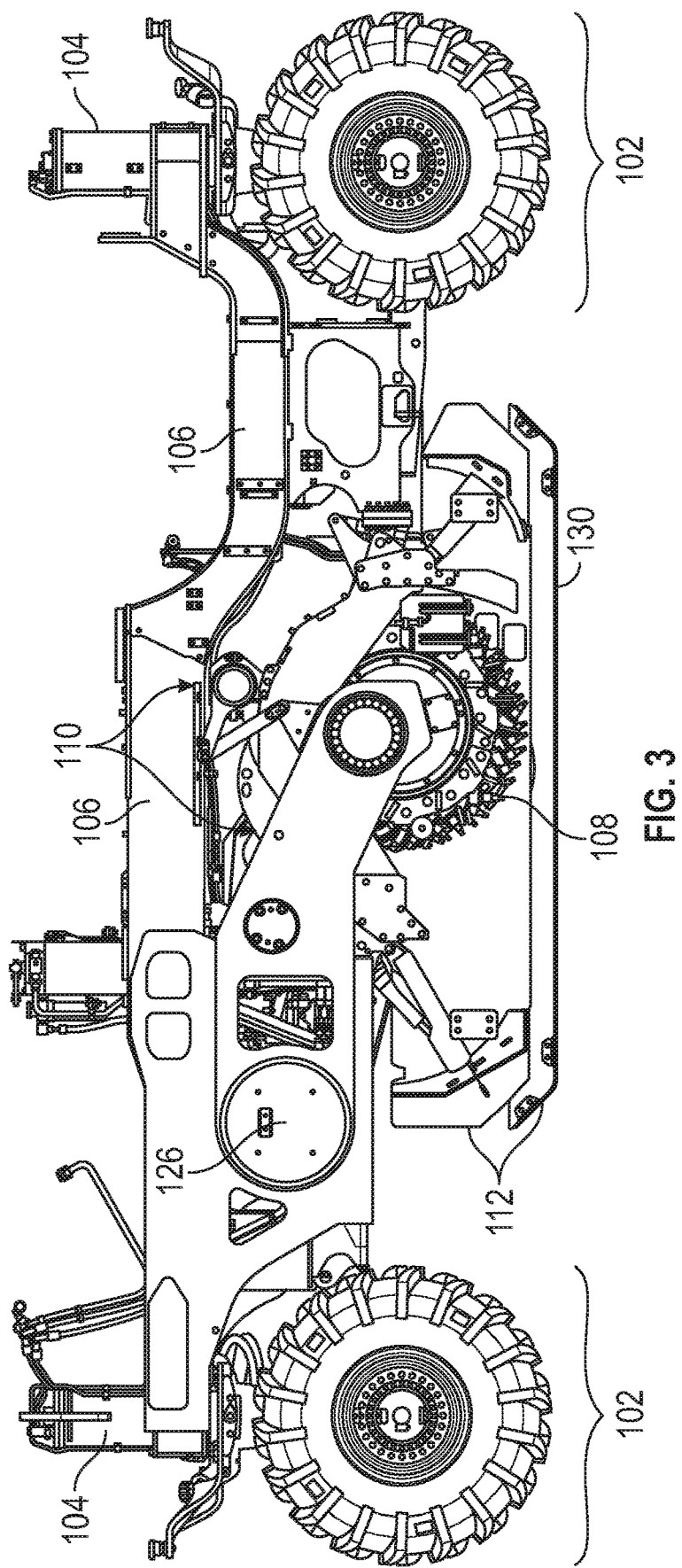
FIG. 3 is a side view of the frame and rotor portion of FIG. 2 with a side of the rotor housing removed, according to one or more embodiments.

Referring now to FIGS. 1-3, a rotary mixer 100 is shown. The rotary mixer 100 may be adapted to cut and/or process a top layer of the ground such as an existing roadway or a new or existing roadway bed. In particular, the rotary mixer 100 may be adapted to cut and/or process a top layer of dirt, gravel, pavement, or other soil. The cutting/processing may involve tearing the desired layer up, mixing it, and laying it back down in a more homogenous arrangement allowing the surface to be compacted and pavement to be placed thereon. As such, the position of the rotor relative to the surface of the ground and, accordingly, the depth of cut that the rotor is performing, are valuable parameters to assess and to be able to control. Various components of the rotary mixer 100 may be relevant in assessing and controlling the rotor position relative the ground. For example, the rotary mixer 100 may include a ground-engaging portion 102, a suspension system 104, a frame 106, a rotor 108, a rotor support system 110, and a rotor housing 112. Apart from the rotor housing 112, a portion of which may float compared to the rotor 108, each of these components may play a role in controlling the position of the rotor 108 relative to the ground.

The ground-engaging portion 102 may engage the ground for purposes of supporting the rotary mixer 100. For example, the ground-engaging portion 102 may include a plurality of wheels or tracks for supporting the rotary mixer 100 and translating the rotary mixer 100 along the ground. In one or more embodiments, the ground-engaging portion 102 may include four wheels. Alternatively, three wheels may be provided. The wheels may include tractor-type wheels of relatively large size with tires having treads for engaging soft and/or loose soils. The wheels/tires may have a large width for distributing high loads to soft soils without sinking and a large diameter for more readily managing holes, obstructions, or sinkage in the soft soils. However, tire size may be selected based on machine weight, anticipated use conditions, or other factors, and most any suitable tire size may be used.

The ground-engaging portion 102 may include an axle or axles tying corresponding wheels together, or the wheels may be independent from one another. The ground-engaging portion 102 may be powered to advance the mixer 100 across the ground and, as such, a drive axle or drive shaft may extend to pairs of wheels or each individual wheel. The drive axle or shaft may be powered by a combustion engine having a transmission for transferring power to the drive shaft/axles. Alternatively, an electric powered motor may be provided. The wheels or other ground-engaging portions 102 may be steerable in pairs or independently and the machine (e.g., the rotary mixer 100) may include front or rear steering or both.

The suspension system 104 may support the frame 106 relative to the ground-engaging portion 102. In one or more embodiments, the suspension system 104 may include an adjustment mechanism 114, shown in FIG. 4, configured to control the position between a wheel or other ground-engaging portion 102 and a respective portion of the frame 106. The adjustment mechanism 114 may include, for example, an extendable leg, such as a telescopic leg or a lever arm, a scissor lift, or other adjustment mechanism may be provided. The adjustment mechanism 114 may allow for a flexible position of the ground-engaging portion 102 relative to the frame 106. However, and unlike many suspension systems, the position of the ground-engaging portion 102 relative to the frame 106 may be precisely controlled and secured.

Figure 4:
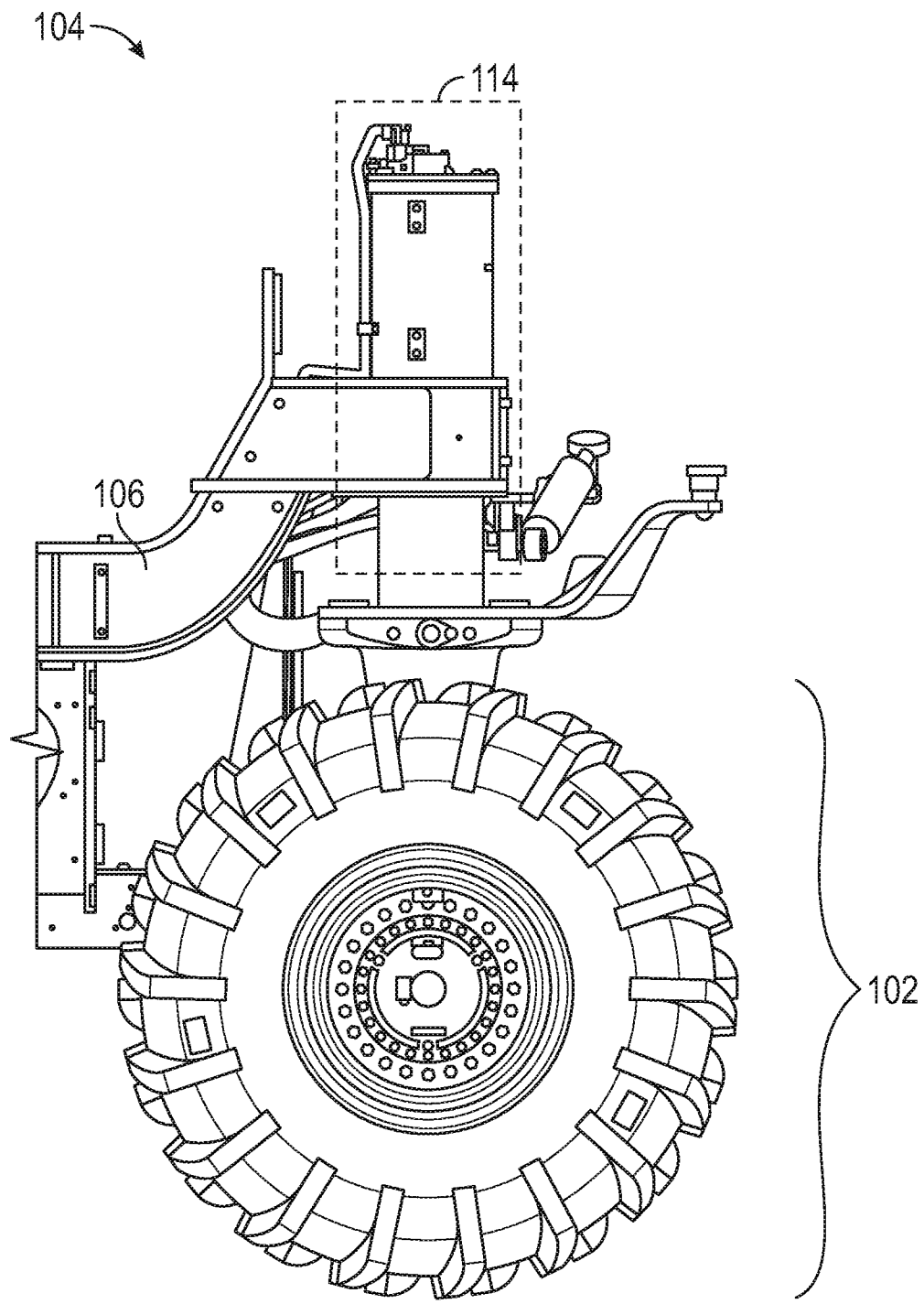
FIG. 4 is a close-up side view of a ground-engaging portion and suspension system, according to one or more embodiments.

In one or more embodiments, as shown in FIG. 4, the flexible and controllable adjustment mechanism 114 may include a telescopic leg. The telescopic leg may include a hydraulically controlled leg allowing the leg to be precisely extended or withdrawn by the operator. The telescopic leg may be in fluid communication with a hydraulic pump and valving system allowing for delivery of pressurized hydraulic fluid to the leg to lengthen or shorten the leg and, as such, push the ground-engaging portion 102 away or draw the ground-engaging portion 102 closer to the frame 106. The leg may be equipped with sensors allowing the amount of extension of the leg to be monitored or determined as the leg is extended. The valving system may allow the leg to be positioned using the hydraulic pressure and then held in position by closing the valves and securing the hydraulic position of the leg. This may provide for a substantially rigid and precisely controlled position of the wheel relative to the frame 106. The hydraulic system of the several wheels may be part of a single hydraulic system for the machine relying on, for example, a centralized pressure reservoir. However, valving and other controls may allow for independent or grouped control of the legs. In one or more embodiments, the machine may include a single leg corresponding to each ground-engaging device or wheel, for example. In other embodiments, multiple legs per wheel may be provided or, alternatively, less than one leg per wheel may be provided such as one leg per pair of wheels, for example.

The suspension system 104 may allow for rigid control of the wheel positions relative to the frame 106. However, in one or more embodiments, the system 104 may be set to float, where, for example, the legs would be allowed to extend or retract based on the contour of the terrain. This may be useful, for example, when the machine is in a travel condition with the rotor 108 lifted away from the ground. In float mode with the machine at the travel position, the legs/cylinders may function more like a shock absorbing suspension system, which may be better for the machine and the operator during transport of the machine from one location on a project to another, such as when travelling from a haul position to a work position, for example.

The frame 106 may be configured to span between the several portions of the suspension system 104, support the operator and the controls of the rotary mixer 100 as well as provide a structure for supporting the rotor 108. The frame 106 may include a tubular structure including longitudinally extending members, cross members, and/or diagonally extending or angled members. While tubular members have been mentioned, other structural shapes including plates, bars, channels, angle shapes, or other structural shapes may be provided. Moreover, the structural shapes may be rolled, bent, curved, or otherwise formed to accommodate particular aspects, components, and shapes of the rotary mixer 100. The frame 106 may include one of a litany of selected arrangements of members adapted for securing the suspension system 104, the rotor 108, the rotor housing 112, the power source, the hydraulic system, and other features. In one or more embodiments, the frame 106 may form a relatively strong bridge from the front suspension system 104 to the rear suspension system 104 and may include an archway there under for arrangement and support of the rotor 108 and the rotor housing 112.

Figure 5:
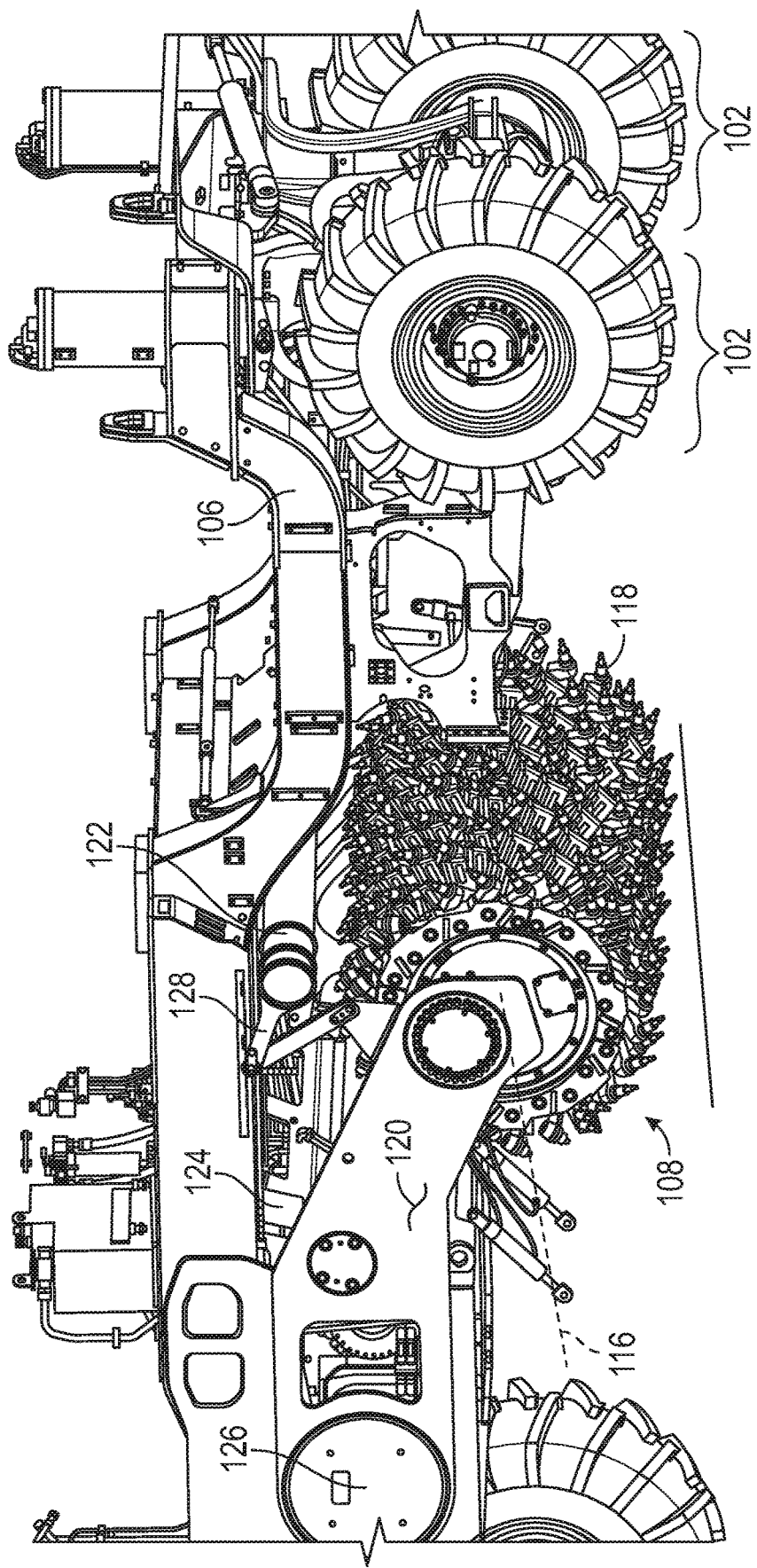
FIG. 5 is a perspective view of the rotary mixer of FIG. 1, with the mixer housing removed and showing the rotor position being canted relative to the ground surface, according to one or more embodiments.

As shown in FIG. 3, and in closer view in FIG. 5, the rotor 108 may be suspended from the frame 106 and may be adapted to cut, mix, or otherwise process a top layer of material arranged beneath the rotary mixer 100. The rotor 108 may include a generally cylindrical can or drum arranged with an axis 116 extending generally across the mixer 100, between the front and rear ground-engaging portions 102, and below the frame 106. The can or drum may be arranged on an axle or other spindle adapted for support at each end and also adapted for powered rotation of the rotor 108.

The rotor 108 may include teeth, blades, spurs, or other cutting elements 118 arranged on a surface or other outer facing portion of the can or drum. The cutting elements 118 may be particularly adapted to cut, shave, and mix material below the mixer 100. The cutting elements 118 may be particularly well suited for cutting, shaving, and/or mixing existing pavements, soil, gravel, rock, or other relatively hard surfaces. As such, the angle of attack of the cutting elements 118 may be precisely controlled or determined and each individual cutting element may be adapted for particular purposes relative to the group of cutting elements 118. Some cutting elements 118 may include carbide or other relatively hard materials and may be adapted for primary cutting, while other cutting elements 118 may include other materials and may be better adapted for mixing. The cutting elements 118 may be arranged such that they are each individually successful in cutting material, and the cutting elements 118 as a whole may be arranged to mix the material and avoid caking or otherwise collecting on the rotor 108. In one or more embodiments, the full width or substantially the full width of the rotor 108 may include cutting elements 118 adapted to contact the ground, and the elements 118 may be staggered such that particular elements are contacting the ground at any given time, while others are not, as the rotor 108 rotates.

As shown in FIG. 3 and in more detail in FIG. 5, the rotor 108 may be supported and controlled by a rotor support system 110. The support system 110 may include a rotor control lever 120 and a torsion bar 122. The control lever 120 may be configured to support and control the position of the rotor 108, while the torsion bar 122 may function to provide supplemental support of the rotor 108. The control lever 120 may include a pair of arms each pivotally supported by the frame 106 and extending along respective sides of the rotor 108. The arms may be adapted to operably engage the ends of the axle of the rotor 108 thereby supporting the rotor 108 and allowing the rotor 108 to rotate. Power to drive the rotor 108 may be provided along one or both of the control arms via a drive axle or other power source.

The control lever 120 may include across member configured for engagement by a hydraulic cylinder or other actuation device 124. The cross member may be arranged between the pair of arms at a point between the pivoting connection of the arms to the frame 106 and the rotor 108. The hydraulic cylinder may, thus, control the pivoted position of the pair of arms and, as such, the position of the rotor 108 relative to the frame 106 of the mixer 100. In one or more embodiments, the hydraulic cylinder or other actuation device 124 may include multiple hydraulic cylinders. In one or more embodiments, the cross member may be omitted and each arm of the control lever 120 may include a hydraulic cylinder connected directly thereto. In one or more embodiments, lateral tipping of the rotor 108 may be avoided and synchronous motion of the control arms may be provided. This may occur by structurally forcing synchronous motion (i.e., by tying the two arms together structurally) or by controlling respective hydraulic cylinders in a synchronous fashion.

Figure 6:
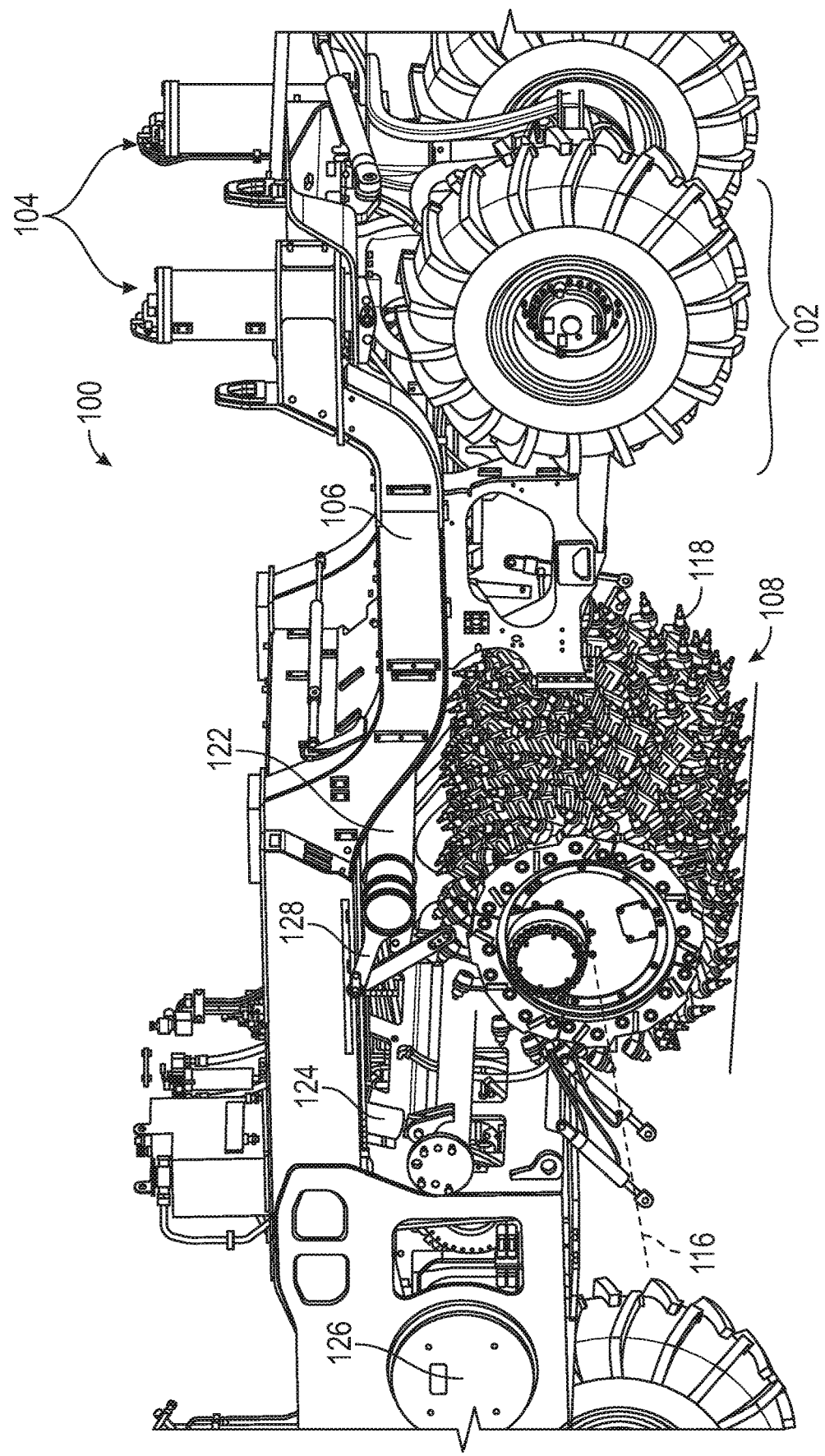
FIG. 6 is a perspective view of the rotary mixer of FIG. 4 showing the rotor in an actual scratch position, according to one or more embodiments.

As may be appreciated from a review of FIGS. 3, 5, and 6, the control lever 120 may be adjusted hydraulically to pivot the control arms about their pivot points 126 and, thus, control the position of the rotor 108 relative to the frame 106. The torsion bar 122 may be in place and connected to the rotor 108 to offset the weight of the rotor 108 allowing the control lever 120 to precisely control the position of the rotor 108 and reducing the effect of the rotor weight on the control lever 120. In one or more embodiments, the torsion bar 122 may be arranged generally parallel to the rotor and between the rotor 108 and the frame 106. The ends of the torsion bar 122 may include linkages 128 at each end connecting the ends of the torsion bar 122 to the rotor 108. The torsion bar 122 may be supported by brackets off of the frame 106 and may generally resist differential rotation at each of its ends. As such, the weight of the rotor 108 may induce a bending moment in the linkages on each end thereof, and causing torsion in the torsion bar 122, which the torsion bar 122 resists. The linkages on opposing ends of the torsion bar 122 may be arranged to induce equal and opposite torsion forces in the torsion bar 122. The torsion bar 122 and linkages may, thus, function as a force resisting spring.

Due to the aggressive interaction between the rotor 108 and the ground, particles or debris may fly from the rotor 108 and may not be contained as desired. This flying debris may also be a hazard to workers or personnel operating the mixer 100. Accordingly, a rotor housing 112 may be provided to contain the debris and allow for the debris to be maintained at or around the rotor 108 to allow for further mixing. The rotor housing 112 may include a plate steel or other separation members forming a housing around the rotor 108 on the front, rear, and sides of the rotor 108. In one or more embodiments, the housing 112 may surround the rotor 108 as mentioned, but it may be supported by the frame 106 so as to avoid imparting additional load on the control levers 120. Moreover, supporting the housing 112 from the frame 106 may be well suited for machines having adjustability for cross slope. However, and alternatively, the housing 112 may be supported by the control levers 120 of the rotor support system so as to move with the rotor 108 as the rotor is adjusted upward and downward relative to the frame 106, while also being be supported by the ground when the housing 112 contacts the ground.

The housing 112 may also include a ground guard 130 adapted to generally continuously engage the ground so as to seal off the working area of the rotor 108. The ground guard 130 may, for example, be arranged like a skirt on a bottom edge of the housing 112. The ground guard 130 may include skids or skis on a bottom edge thereof that engage the ground and support the guard 130 relative to the ground. The ground guard 130 may be slidably supported by the housing 112, such that the ground guard 130 may move up and down relative to the housing 112 substantially independent of the housing 112 position. For example, as shown in FIGS. 1 and 2, the ground guard 130 may be secured to the housing 112 with a bar extending outward to a cleat or plate. The ground guard 130 may include a sliding slot 132 for slidably engaging the bar and allowing the ground guard 130 to articulate upward and downward as the housing 112 gets closer and further away from the ground respectively. In this way, so long as the range of motion of the ground guard 130 is not exceeded, the ground guard 130 helps to ensure that generally continuous contact with the ground is made to seal the rotor working area.

Figure 7:
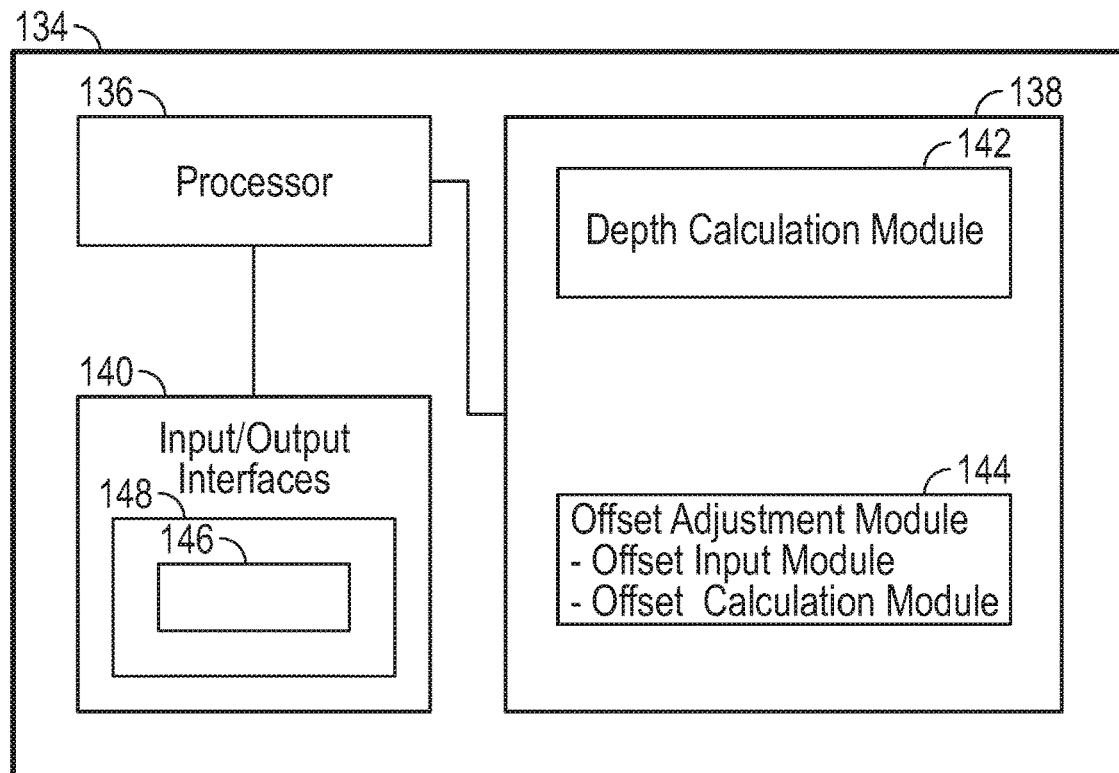
FIG. 7 is a schematic diagram of a control module, according to one or more embodiments.
Figure 8:
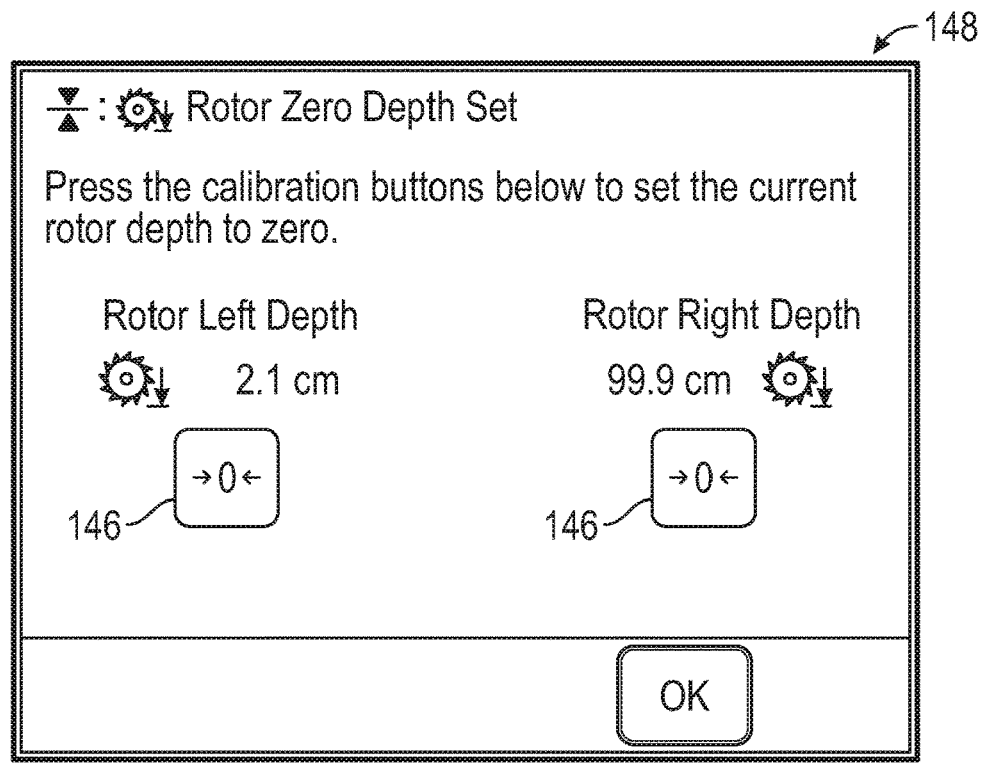
FIG. 8 is a view of an adjustment capture interface, according to one or more embodiments.

In addition to the various components that affect rotor depth, a control and monitor system or control module 134 may be provided to determine and/or control the rotor depth. That is, as shown in FIG. 1 and in more detail in FIG. 7, the rotary mixer 100 or other implement may include a control module 134 including a computing device equipped with a power source, a processor 136, a computer-readable storage medium 138, and one or a series of user interfaces 140 including one or more of a key pad, a touch screen, a monitor, a joystick, a mouse, and/or other inputs/outputs. The control module 134 may include software or instructions stored in the computer-readable storage medium 138 for processing by the processor 136 to control the machine. One or more particularly adapted modules may be provided as part of the control module 134 and may include software, hardware, or a combination thereof. For example, in one or more embodiments, a depth calculation module 142 may be provided for determining the nominal rotor depth and/or a more accurate or actual rotor depth relying on an offset adjustment. The depth calculation module 142 may, thus, include software and/or instructions to calculate and control the rotor position relative to the ground. In addition, and for purposes of determining the more accurate or actual rotor depth mentioned, an offset adjustment module 144 may be provided for capturing and adjusting the rotor depth based on factors that are not readily ascertainable. In one or more embodiments, as shown in FIGS. 7 and 8, an adjustment capture module 146 may be provided for capturing one or more adjustment offsets for the rotor or tool depth. The adjustment capture module 146 may cooperate with the offset adjustment module 144 and the depth calculation module 142 to allow the operator to more readily appreciate the rotor depth relative to the ground. In one or more embodiments, as shown in FIG. 8, the adjustment capture module 146 may be provided in conjunction with a depth gauge 148 showing the operator the rotor position relative to the ground.

More particularly, the control module 134 may be relied on to process the software or instructions on the computer-readable storage medium 138 to adjust the rotor position relative to the ground, establish a scratch position, and adjust the rotor from the scratch position to a desired depth of cut or depth of mixing/processing. The software or instructions on the computing device may account for a series of ascertainable factors affecting the rotor position. In one or more embodiments, the system may include an offset adjustment to account for other factors not readily ascertainable and not incorporated into the system calculations. The offset adjustment may be different for each side of the rotor and, as such, independent offset adjustments for each side of the rotor may be provided.

In one or more embodiments, the depth calculation module 142 may add several dimensions to establish a frame height for each side of the rotary mixer 100. Since the rotor height is adjustable relative to the frame by pivoting the control lever about a pivot point, the frame height may be established at the pivot point of the control lever. From these respective heights (i.e., a height for each side of the frame at the pivot points), the system may subtract several dimensions to establish a rotor height for each side of the rotor. Aside from factors that affect rotor height that are not readily ascertainable (i.e., assuming these factors do not appreciably affect the rotor height), the calculations may be used to establish a nominal scratch position and a depth of cut of the rotor.

More particularly, for example, the depth calculation module 142 may have information regarding wheel size, rim size, tire size, and tire pressure in addition to overall vehicle weight. The system may use these dimensions and information to establish an overall diameter of the wheel system and may incorporate tire sag under load to establish the center point of the wheel above the ground surface. The center point of the wheel may have a known offset from the frame based on the suspension system and adjustments in the suspension system may be used to establish heights of the frame at each of the leg positions of the vehicle. Given the several frame positions, the height of the frame at each pivot point of the control lever may be established using slope information relating the several frame positions at the legs. For example, side-to-side slopes may exist as well as front-to-back slopes, and the height of the pivot point for each side of the control lever may be impacted by these slopes. Offsets, steps, or other frame shape features may also be included. In one or more embodiments, a more sophisticated approach to this may be used including a finite element analysis taking into consideration deflections in the frame due to the forces imparted on the frame in addition to the frame positions at the legs. Still other mathematical models may be used. Further calculations may be used to establish the height of the rotor. For example, the control lever may pivot about a pivot axis extending through the two pivot points and, as such, the rotor position may travel along an arc as it moves closer to and further away from the ground. The angle of the control lever and its length may be used to establish a centerline position of the rotor relative to the pivot point axis. Moreover, the diameter of the rotor including the cutting elements may be used to establish the position of the bottom of the rotor. Given the respective left and right positions of the rotor, the nominal position of the rotor relative to the ground may be established by subtracting the distance from the pivot point to the bottom of the rotor from the height of the pivot point above the ground. The above steps and/or portions thereof may be used to establish a nominal scratch position for the rotor. It is to be appreciated that the relative position and orientation of the several components of the machine may be established using sensors to assess elongation, retraction, rotation, etc., and such sensors may be in communication with the control module 134 to provide positional information used in the calculations.

In one or more embodiments, a particular algorithm may be used to calculate the rotor position, and one example with example values may be provided as follows:

Actual Left Rotor Depth Raw=Rotor Vertical Distance+Left Side Leg Vertical Distance Actual Right Rotor Depth Raw=Rotor Vertical Distance+Right Side Leg Vertical Distance Actual Left Rotor Depth Adjusted=Actual Left Rotor Depth Raw−Left Scratch Offset Distance Actual Right Rotor Depth Adjusted=Actual Right Rotor Depth Raw−Right Scratch Offset Distance Rotor Vertical *Displ.* =

$(0.0006 * \text{Rotor } Cyl\ Displ.)^2 - (2.1148 + \text{Rotor } Cyl\ Displ.) + 31.267$ Front Leg Center Distance = 3278 mm Rear Leg Center Distance = 3772 mm Actual Left Side Legs Vertical *Displ.* =

$$\frac{\{[\text{Left Front Leg } Cyl.\ Displ. * \text{Front Legs Center } Dist] + [\text{Left Rear Leg } Cyl.\ Displ. * \text{Rear Legs Center } Dist]\}}{\{\text{Left Legs Center } Dist + \text{Rear Legs Center } Dist\}}$$

Actual Right Side Legs Vertical *Displ.* =

$$\frac{\{[\text{Right Front Leg } Cyl.\ Displ. * \text{Front Legs Center } Dist] + [\text{Right Rear Leg } Cyl.\ Displ. * \text{Rear Legs Center } Dist]\}}{\{\text{Front Legs Center } Dist + \text{Rear Legs Center } Dist\}}$$

Left Side Scratch Offset Distance =

Current Actual Left Side Rotor Depth Raw

Right Side Scratch Offset Distance =

Current Actual Right Side Rotor Depth Raw

The above is but one example of how the rotor position may be calculated.

Moreover, and as mentioned, several other factors may affect the height of the rotor relative to the ground, and such factors may not be readily ascertainable. For example, the soil conditions (i.e., the softness or hardness of the soil) may affect how much the machine sinks into the soil during use. Moreover, the soil conditions may change as the machine travels along a working path, and adjustments may need to be made throughout a project. Other factors may include the effect of air pressure in the tires, wearing of components such as bearings or other components affecting spatial relationships or offsets between components. Still other factors may exist that are not readily ascertainable. In one example, a rotary mixer may be used to cut into an existing roadway surface, and one side of the machine may be supported by the ground off the side of the pavement while the other side of the machine may be supported more near the center of the roadway and on the pavement. Accordingly, the side supported by the ground may sit lower than the side supported by the pavement due to the softness of the ground and/or due to elevation changes between the pavement and the ground.

To address these factors that are not readily ascertainable, the system may include an offset adjustment module 144. The offset adjustment module 144 may be used with respect to each side of the rotor to accommodate differences from one side of the machine to another. The offset adjustment may be established as described in more detail below and may be included in the calculations to more accurately establish a scratch position and/or a depth of cut of the rotor. That is, for example, where the calculated position results in a rotor position that is actually below the surface, the offset adjustment may be used to raise the rotor position that is understood to be at a scratch position. Where the calculated position results in a rotor position that is actually above the surface, the offset adjustment may be used to lower the rotor position that is understood to be at a scratch position.

With reference to FIGS. 5 and 6, in one or more embodiments, a control and visual inspection process may be used to establish and capture the offset adjustment. For example, the rotary mixer 100 or other implement may be delivered to a project site and offloaded for operation. The rotary mixer 100 or other implement may then be driven to and/or arranged in its working environment. In one or more embodiments, initial operation of the machine (e.g., the rotary mixer 100) may be conducted to allow the machine to settle into its operative position. That is, the vibrations and shaking of the machine may have an effect on its ride height relative to the ground, and initial operation may help to establish a baseline of its ride position. The rotor height may be calculated by the system, and the operator may adjust the rotor 108 to a nominal scratch position. For example, the operator may adjust the rotor 108 such that the cutting elements of the rotor 108 are thought to be flush with the ground. However, this adjustment may be made without knowledge of several of the factors mentioned that are not readily ascertainable. Accordingly, while the machine may adjust the rotor 108 to a position it believes to be flush with ground, the rotor 108 may not actually be flush as shown in FIG. 5. To address this, the operator or support personnel may inspect the rotor 108 to determines its position relative to the ground. Where the rotor 108 is too deep or where the rotor 108 is above the ground, the operator may adjust the machine to place the rotor 108 flush with the ground as shown in FIG. 6.

For example, the operator may adjust the suspension legs to tip the machine from side to side, or the operator may adjust the suspension legs to tip the machine from front to back or adjust the height of the machine without tipping. Moreover, the control lever 120 may be used to adjust the height of the rotor 108 relative to the frame 106. The operator may manually make the adjustments and may use visual inspection or sensors to determine when each side of the rotor 108 is in contact with or flush with the ground. At that point, the adjustment capture module 146 of the system may be used to capture the position of the rotor 108 compared to its nominal position for each side of the rotor 108.

The system, and in particular, the offset adjustment module 144, may then incorporate the captured offset into the rotor position calculations performed by the depth calculation module 142 by adjusting the position of the rotor 108 upward or downward based on the adjustment to accommodate the factors that are not readily ascertainable. The adjustment capture feature 146 of the system may be with respect to each side of the rotor 108 and, as such, may be used to accommodate side to side tipping of the machine using leg adjustments to tip the machine so as to provide a rotor 108 that operates generally parallel with the surface of the ground. As may be appreciated, the offset adjustment module 144 may provide a revised baseline based on actual in-field conditions, allowing the operator to more confidently rely on variations from the baseline. More particularly, by using the adjustment capture module 146, the depth gauge 148 may be reset to a depth of zero when the rotor 108 is at an actual scratch position. As such, variations above or below the zero point may more accurately reflect the rotor position relative to the ground surface taking the factors into account that are not readily ascertainable.

While effects of tire pressure have been said to not be readily ascertainable, particular knowledge of the tires being used and their response to pressure may allow for incorporation of tire pressure into the nominal rotor position. That is, given the relatively fine measurements associated with the depth of cut of the rotary mixer 100 and the size of the tires, the tire inflation may be a factor to consider when estimating or calculating the rotor position. Accordingly, tire pressure may be monitored on a continuous or periodic basis such that changes in tire pressure from temperature fluctuations or other factors affecting tire pressure may be addressed. In one or more embodiments, an adjustment table may be established for a particular tire where, for example, a range of tire pressures may be associated with a range of height adjustments for the machine. Where the tire pressure is at a design pressure or expected pressure, the adjustment may be zero. However, where the tire pressure is above the design pressure, the machine may be adjusted down (i.e., closer to the ground or other supporting surface) to compensate for an elevation of the machine. In contrast, where the tire pressure is low, the machine may be adjusted upward (i.e., further from the ground or other supporting surface) to compensate for overly sagging tires. Each of the tires may be monitored independently and may be compensated for by adjusting its associated leg or other suspension system 104. In one or more embodiments, each leg may be independently adjustable. In other embodiments, some of the legs may be independently adjustable and other legs may be adjustable in pairs. For example, in one or more embodiments, the front legs may be independently adjustable and the back legs may be adjustable as a pair.

In one or more embodiments, tables of axle height to tire pressure may be established using modeling or empirical techniques such that measurements of tire pressure may be used to more accurately establish the axle height of an axle supported by the wheel. In one or more embodiments, the system may include a process of receiving tire pressure input and adjusting the height of the frame 106 at the respective wheel according to the tire pressure by looking up an offset value in a table or otherwise incorporating tire pressure into the frame height at a respective wheel.

Figure 9:
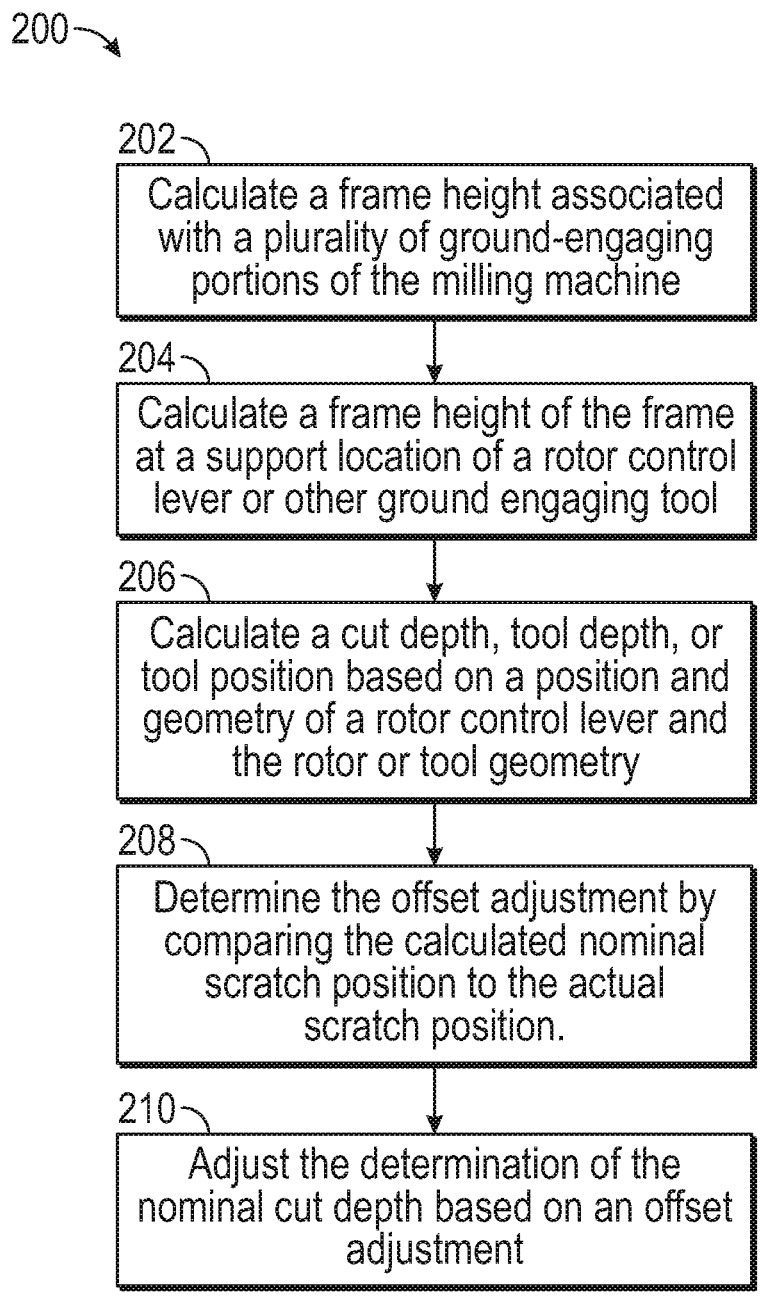
FIG. 9 is a diagram showing method operations performed by the control module to calculate a rotor position or depth.

In operation, the rotary mixer 100 or other implement may perform a method (200) of determining a rotor position or cut depth as shown in FIG. 9. The rotary mixer, and in particular, the control module thereof, may calculate a frame height associated with a plurality of ground-engaging portions of the milling machine (202). The system may also calculate a frame height of the frame at a support location of a rotor control lever or other ground engaging tool, for example (204). Still further, the system may calculate a cut depth, tool depth, or tool position based on a position and geometry of a rotor control lever and the rotor or tool geometry (206). Given the existence of factors that are not readily ascertainable, the system may adjust the determination of the nominal cut depth based on an offset adjustment (210). The offset adjustment may include a distance between a nominal scratch position and an actual scratch position and may include an adjustment for the left and right sides of the machine. The offset adjustment may be established based on input from a user. For example, the operator may adjust the position of the rotor and rely on visual inspection to iteratively adjust the rotor until it is in an actual scratch position. The user may then depress a button or interact with an interface to inform the machine that the rotor is at an actual scratch position. The system may then determine the offset adjustment by comparing the calculated nominal scratch position to the actual scratch position (208).

Figure 10:
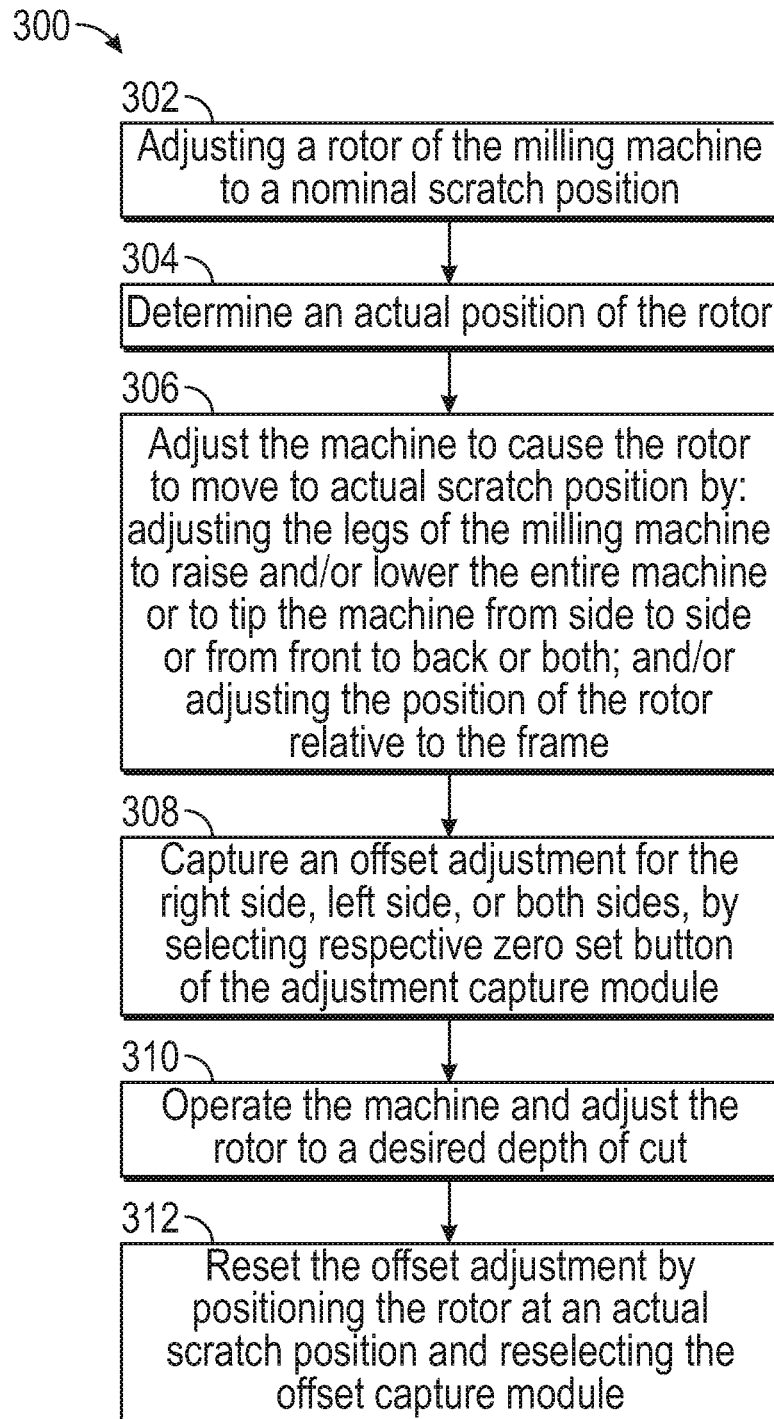
FIG. 10 is a diagram showing method operations performed by a user to adjust a rotor position and establish an actual scratch position.

From a user's perspective, a method (300) of operating a milling machine may include one or more of the steps shown in FIG. 10. For example, a user may adjust a rotor of the milling machine to a nominal scratch position (302). The user may then visually inspect or rely on sensors to determine an actual position of the rotor (304). Where the nominal scratch position of the rotor is not the same as an actual scratch position, the user may adjust the machine to cause the rotor to move to an actual scratch position (306). More particularly, the user may adjust the legs of the milling machine to raise and/or lower the entire machine or to tip the machine from side to side or from front to back or both. Still further, the position of the rotor relative to the frame may be adjusted. These adjustments may be iterative and may be made based on visual inspection of the rotor until the rotor is arranged at an actual scratch position. At that time, it may be appreciated that the depth gauge of the control module may reflect that the rotor is at a position that varies from the nominal scratch position. For example, the depth gauge may indicate that one side of the rotor is above scratch or that it is below scratch by some dimension. The other side of the rotor may also be shown to be above or below scratch by some dimension. Having adjusted the rotor from a nominal scratch position to an actual scratch position, the dimension shown on the depth gauge may be the offset adjustment between nominal scratch and actual scratch positions of the rotor. As such, the user may capture an offset adjustment by selecting the zero set buttons of the adjustment capture module (308). This may allow the system to capture the offset adjustment and use that adjustment going forward to accommodate factors that are not readily ascertainable. Selection of the capture module may reset the depth gauge to zero allowing variations from the actual scratch position to be more readily appreciated by the user. It is to be appreciated that the user may capture the offset for the right and left sides of the machine to accommodate right to left variances. The user may operate the machine and may adjust the rotor to a desired depth of cut (310). Through the course of use, the soil conditions or other factors may change from time to time and the offset adjustment may be reset by positioning the rotor at an actual scratch position and reselecting the offset capture module (312).

It is to be appreciated that adjustment of the machine (306) may be used for purposes beyond controlling rotor depth. That is, for example, the user may adjust the machine legs to a selected height for purposes of having the chamber carried or held at a particular height above ground. In one or more embodiments, the chamber height may be positioned such that the ground guards engage the ground at the midpoint of their stroke. This selection may maximize and/or balance the available upward and downward motion of the ground guard and, as such, may help to avoid having the chamber hang up on the ground while also allowing for accommodation of low ground areas to avoid rotor exposure. In other examples, the user may select an upper % point of the stroke of the ground guards to avoid exposure, but to provide more accommodations for high ground areas that may cause the chamber to hang up. Still other chamber positions may be selected by the user.

INDUSTRIAL APPLICABILITY

The present disclosure, in one or more embodiments, relates to devices, systems, and methods for calculating the rotor position relative to the ground of a rotary mixer and determining an adjustment offset to account for conditions that are not readily ascertainable. This system is advantageous because it allows for precise calculations to be made based on known factors while also allowing for adjustment of those calculations based on factors that are not known or are not readily ascertainable. The system allows the rotor of a rotary mixer, for example, to be placed at an actual scratch position and for the machine to be reset, so to speak, to understand or learn where that position is. Accordingly, the reset position and, in particular, variations from that reset position may be relied on by the operator to adjust the rotor depth without having to worry or keep in mind where the actual scratch position is. For example, and without the presently disclosed technology, the user may previously have had to adjust the machine to an actual scratch position and make note of the rotor depth on the depth gauge. As the rotor was adjusted, the user may then manually have had to consider the variations from the indicated depth on the gauge and do the associated math to understand the actual depth of the rotor. By providing the adjustment capture module, the depth gauge can be reset to zero when the rotor is at an actual scratch position and the machine may adjust its calculations to perform the math and allow the depth gauge to reflect the actual rotor depth relative to the ground.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

What is claimed is:

1. An implement with a ground-engaging tool, comprising:
   a frame;
   a ground-engaging portion for supporting the frame on a surface of ground;
   a suspension system coupling the ground-engaging portion to the frame and for adjusting the frame relative to the ground-engaging portion;
   a tool supported by and adjustable relative to the frame and configured for working the ground; and
   a control and monitoring system configured for establishing a nominal position of the tool relative to the surface, wherein the nominal position is a calculated position where at least a portion of a bottom of the tool may be one of above or below the surface and for establishing an actual position of the tool relative to the surface, wherein the actual position is defined by the bottom of the tool being flush and in contact with the surface based on an offset adjustment.

2. The implement of claim 1, wherein the implement is a rotary mixer and the tool is a rotor.

3. The implement of claim 1, wherein the control and monitoring system includes an adjustment capture input for capturing the offset adjustment.

4. The implement of claim 3, wherein the adjustment capture input triggers the control and monitoring system to capture the offset adjustment by equating it to a distance between a nominal scratch position and an actual scratch position.

5. The implement of claim 4, wherein the adjustment capture input comprises a left input for capturing a left offset adjustment and a right input for capturing a right offset adjustment.

6. The implement of claim 3, wherein the ground-engaging portion comprises a plurality of wheel systems and the suspension system comprises an adjustable leg for each of the plurality of wheel systems.

7. The implement of claim 6, wherein the adjustable leg is configured for adjusting the tool between a nominal scratch position and an actual scratch position.

8. The implement of claim 7, wherein the adjustment capture input is configured to capture an amount of adjustment of the rotor due to one of leg adjustments and rotor adjustments when the tool is adjusted between a nominal scratch position and an actual scratch position.

9. A method of determining a rotor tool depth of a milling machine, comprising:
   calculating a frame height associated with a plurality of ground-engaging portions of the milling machine;
   calculating a frame height of the frame at a support location of a rotor control lever of a rotor tool of the milling machine; and
   calculating a cut depth based on a position and geometry of the rotor control lever and geometry of the rotor tool.

10. The method of claim 9, wherein calculating a frame height comprises considerations for tire sag.

11. The method of claim 9, further comprising adjusting the determination of the nominal cut depth based on an offset adjustment.

12. The method of claim 11, wherein the offset adjustment comprises a distance between a nominal scratch position and an actual scratch position.

13. The method of claim 12, wherein the offset adjustment comprises a left offset adjustment and a right offset adjustment.

14. The method of claim 12, further comprising capturing the offset adjustment based on input from a user.

15. The method of claim 14, further comprising determining the offset adjustment.

16. The method of claim 15, wherein determining the offset adjustment comprises adjusting the rotor to an actual scratch position and comparing the position to a nominal scratch position.

17. A method of operating a milling machine, comprising:
   adjusting a rotor tool of the milling machine to a nominal scratch position;
   visually inspecting the rotor tool to determine an actual position of the rotor tool;
   adjusting one of a position of the rotor tool and a leg of the milling machine to cause the rotor tool to move to an actual scratch position; and
   capturing an offset adjustment between the nominal scratch position and the actual scratch position by selecting an offset adjustment input.

18. The method of claim 17, wherein selecting an offset adjustment input comprises selecting one of a left offset adjustment input and a right offset adjustment input.

19. The method of claim 17, further comprising adjusting the rotor tool to a desired depth of cut after capturing the offset adjustment.

20. The method of claim 17, further comprising readjusting one of a position of the rotor tool and a leg of the milling machine when surface conditions change and recapturing the offset adjustment.

* * * * *